July 5, 1949. N. LESTER 2,475,395

INJECTION MOLDING MACHINE

Filed Feb. 13, 1946

INVENTOR.
NATHAN LESTER
BY
Oberlin & Limbach
ATTORNEYS

Patented July 5, 1949

2,475,395

UNITED STATES PATENT OFFICE 2,475,395

INJECTION MOLDING MACHINE

Nathan Lester, Shaker Heights, Ohio, assignor to Lester Engineering Company, Cleveland, Ohio, a corporation of Ohio Application February 13, 1946, Serial No. 647,260

2 Claims. (Cl. 18—30)

The present invention relates to that part of an injection molding or pressure casting machine wherein the material to be molded is subjected to heat and pressure to reduce it to a plasticized state and then injected into a die or mold forming cavity. More specifically, the invention resides in various improvements in an internally heated spreader mounted in the injection cylinder of such a machine. As is well known in the art, such spreaders (sometimes known in the art as a "pineapple" or "torpedo") insure rapid and uniform transmission of heat to the material to be molded by spreading the material to reduce its cross section and thus increase its surface area in contact with a heated spreader and a heated cylinder.

One of the objects of this invention is to provide a spreader having an electrically heated element and a thermocouple therein in which the lead wires for such units are entirely within the spreader and do not pass through other parts of the machine or injection cylinder.

Another object is to provide an injection cylinder having such a spreader in which the discharge nozzle is co-axial therewith.

Another object is to provide a spreader having two independent passages at one end thereof, one for the wires for the heating element and thermocouple and the other for affording communication between the injection cylinder and the discharge nozzle.

Another object is to provide a spreader having wall portions for smoothly diverting flow of plasticized material from an annular space surrounding the spreader to the discharge nozzle.

Another object is to provide a spreader having a cap secured to its shank and from which end the units within the spreader may be installed, thereby permitting mounting of the discharge nozzle centrally of the spreader at its other end.

Additional objects and advantages of the invention will become apparent as the following description proceeds.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 1:
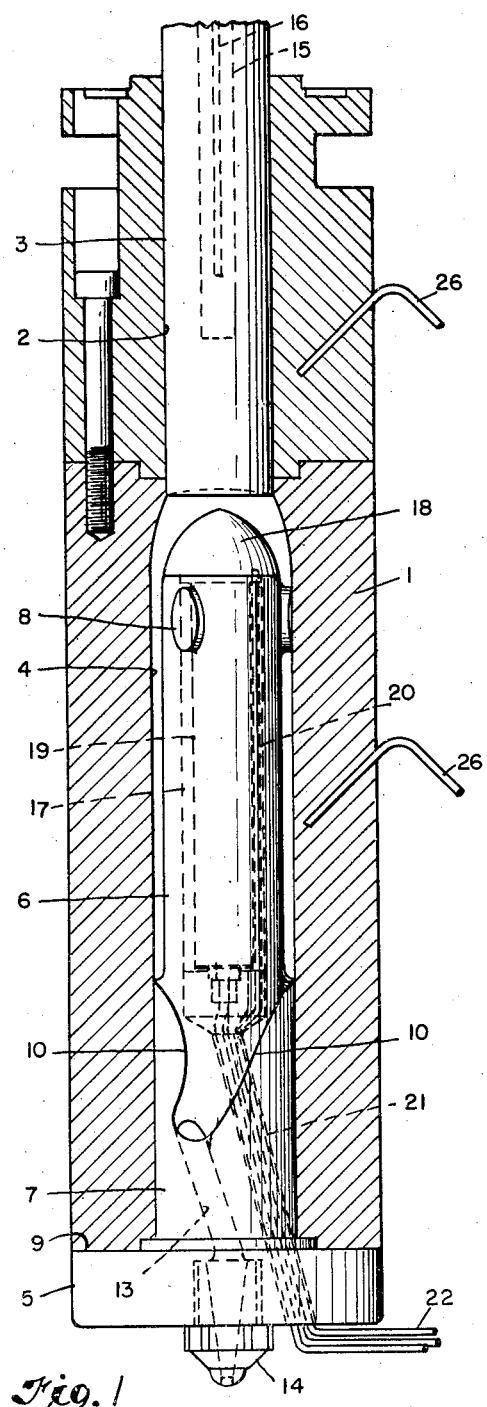
Fig. 1 is a longitudinal cross sectional view through an injection cylinder showing the plunger at its inner position.

Now referring more particularly to the drawings, there is shown therein an injection cylinder body 1 having an inner bore portion 2 in which a plunger 3 is adapted to reciprocate. In Fig. 1 the plunger 3 is shown at its innermost point of movement within the bore 2. Cylinder body 1 also has an enlarged outer bore portion 4 merging with the bore 2. Plunger 3 is preferably of the water cooled type and includes a passage 15 with a partition 16 therein. In this form, cold water enters on one side of the partition and flows out toward the other side of the partition.

Extending longitudinally into the bore 4 is a spreader 5 which includes a shank 6 and a head 7. Shank 6 is of diameter less than that of bore 4 to provide an annular space therebetween. Head 7 is closely fitted into bore 4. Also closely fitted in bore 4 are the extremities of a plurality of spaced lugs 8 preferably of elliptical or other elongated shape so as not to materially impede flow of the material to be molded therepast. Thus shank 6 is rigidly held in a position co-axial of bore 4 by means of head 7 and lugs 8. Being thus held, the annular space between shank 6 and bore 4 will be of uniform thickness and therefore the material to be molded will be uniformly heated as it flows therepast. The spreader is provided with a flange 9 in engagement with the end face of the cylinder body 1. Such engagement can be accomplished as for example by a plurality of bolts through the flange 9 engaged in threaded bores in the end of cylinder body 1. Such bolts and threaded bores are not shown in the drawing.

Figure 2:
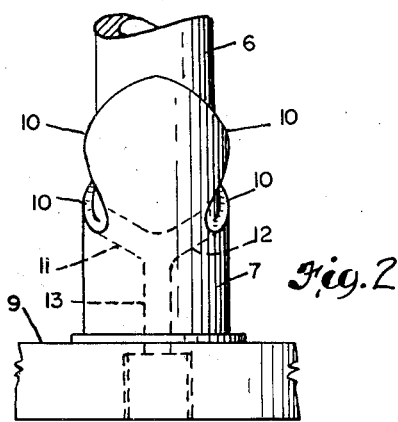
Fig. 2 is a view of the head end of the spreader alone as viewed from the left-hand end of Fig. 1.

In the form of spreader shown in Figs. 1 and 2, the shank 6 joins the head 7 is a plurality of converging walls 10 which commence at points 180° apart and merge at points longitudinal of the starting points. At the points of merging passages 11 and 12 in the head 7 terminate in openings in the shank 6. Passages 11 and 12 join a single passage 13 which leads to the outer end face of the head 7. A discharge nozzle 14 is secured to the spreader and is preferably disposed with its passage co-axial of the head 7 and shank 6. Discharge nozzle 14 is in communication with passage 13. Shank 6 is provided with a bore 17 extending longitudinally of the spreader and extending throughout the full extent of shank 6.

Bore 17 is closed as by a dome shaped cap 18 which may be welded or otherwise firmly secured to the shank 6. Within bore 17 is an electric heating element cartridge 19 and a thermocouple 20, both extending longitudinally along a substantial portion of the length of bore 17. Head 7 is provided with a passage 21 entirely independent of the passages 11, 12 and 13 which communicates with bore 17 and terminates in an opening at the end face of the head and of the spreader. In this passage 21 are the lead wires 22 for the electric heating element 19 and the thermocouple 20. Thus, it can be seen that the lead wires 22 are entirely within the spreader and do not pass through the cylinder body 1 or other parts of the machine.

Figure 3:
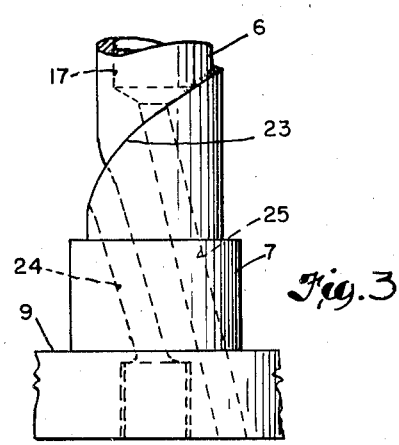
Figs. 3 and 4 are views of the head end of a modified form of spreader.
Figure 4:
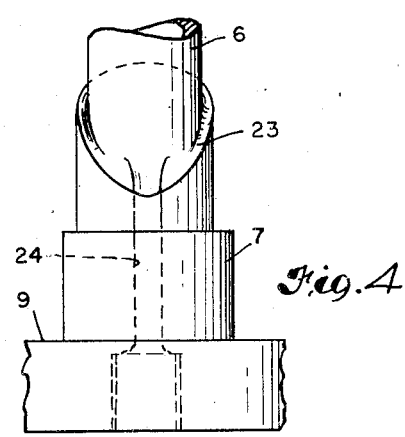

The modified form of spreader shown in Figs. 3 and 4 is substantially the same as that shown in Figs. 1 and 2 except that the shank 6 and the head 7 join in an inclined wall 23. A passage 24 in the head 7 terminates in an opening in the shank 6 adjacent said wall 23 in a region where the wall is closest to the outer end of the head 7. Passage 25 is the same as passage 21 in Fig. 1.

In Fig. 1, no means are shown for heating the cylinder body 1. However, it is common practice to provide a heating jacket or the like surrounding the cylinder body 1. For closely regulating the temperature of the cylinder body 1, thermocouples 26 are inserted thereinto at various points. The temperature of the spreader is, of course, closely controlled by means of the thermocouple 20 therein. Thus having means for closely maintaining the spreader 5 and cylinder body 1 at desired temperatures, the material to be molded can be heated to a predetermined temperature. The uniformity and rapidity of heat transfer from the spreader and cylinder to the material to be molded is assured by the uniform cross section, annular space between shank 6 and the bore 4 through which the material flows.

In both forms of spreaders shown, the material to be molded will, as it flows in said annular space, be smoothly and gradually diverted from annular form to solid cylindrical form by the above-described walls and passages.

Other modes of applying the principle of the invention may be employed, change being made as regards the details described, provided the features stated in any of the following claims or the equivalent of such be employed.

I, therefore, particularly point out and distinctly claim as my invention:

1. The combination with the injection cylinder of a pressure molding machine, of a spreader in such cylinder comprising head and shank portions respectively closely fitted in and spaced from the bore of such cylinder, a single discharge nozzle at the end of the head portion of said spreader, said head portion being formed with but two channels in its outer surface defining a pair of passages with such cylinder bore leading from the space between said shank portion and cylinder bore toward said discharge nozzle, such channels, at the juncture of the head and shank portions of the spreader, each being of substantially 180° width and of depth substantially equal to the radial distance between such cylinder bore and shank portion and smoothly converging in width toward said discharge nozzle and at the same time curving toward one side of said head portion, said head portion being further formed with a pair of merging bores respectively connecting reduced width end portions of such channels with said discharge nozzle, such bores being of diameter relatively greater than the aforesaid radial distance and substantially corresponding with the width of the channels at such end portions of the latter, such end portions of the channels being of curved contour substantially coinciding with portions of the walls of such merging bores.

2. A combination with the injection cylinder of a pressure molding machine, of a spreader in such cylinder comprising head and shank portions respectively closely fitted in and spaced from the bore of such cylinder, a discharge nozzle in the head portion spaced from the juncture of the head and shank portions, said head portion being formed with a channel in its outer surface defining a passage with such cylinder bore leading from the space between such shank portion and cylinder bore toward said discharge nozzle and smoothly converging in width toward said nozzle and with a bore connecting a reduced width portion of such passage with said discharge nozzle, electric heating means disposed centrally within said spreader and extending axially along such shank portion of said spreader, and a thermocouple controlling said heating means disposed axially within the shank portion of said spreader alongside said heating means and between said heating means and the outer surface of the shank portion of said spreader.

NATHAN LESTER.

REFERENCES CITED

The following references are of record in the file of this patent:

UNITED STATES PATENTS

| Number | Name | Date |
|---|---|---|
| 1,986,544 | Theuer | Jan. 1, 1935 |
| 2,206,098 | Lester | July 2, 1940 |
| 2,233,558 | Shaw | Mar. 4, 1941 |
| 2,309,496 | Bird et al. | Jan. 26, 1943 |
| 2,372,833 | Jobst | Apr. 3, 1945 |